US011878477B2

(12) United States Patent
Unno et al.

(10) Patent No.: US 11,878,477 B2
(45) Date of Patent: Jan. 23, 2024

(54) TEMPERATURE CONTROL APPARATUS AND TEMPERATURE CONTROL METHOD

(71) Applicants: Sanyo-Onoda City Public University Corporation, Yamaguchi (JP); PACRAFT Co., Ltd., Tokyo (JP)

(72) Inventors: Noriyuki Unno, Yamaguchi-ken (JP); Kazuhisa Yuki, Yamaguchi-ken (JP)

(73) Assignees: SANYO-ONODA CITY PUBLIC UNIVERSITY CORPORATION, Yamaguchi (JP); PACRAFT CO., LTD., Tokyo (JP)

( * ) Notice: Subject to any disclaimer, the term of this patent is extended or adjusted under 35 U.S.C. 154(b) by 0 days.

(21) Appl. No.: 17/505,469

(22) Filed: Oct. 19, 2021

(65) Prior Publication Data
US 2022/0126524 A1 Apr. 28, 2022

(30) Foreign Application Priority Data

Oct. 28, 2020 (JP) .................................. 2020-180818
Oct. 1, 2021 (JP) .................................. 2021-163034

(51) Int. Cl.
B29C 65/00 (2006.01)
(52) U.S. Cl.
CPC ...... B29C 66/9141 (2013.01); B29C 66/8145 (2013.01); B29C 66/8181 (2013.01)
(58) Field of Classification Search
CPC ...................... B29C 66/9141; B29C 66/91421
See application file for complete search history.

(56) References Cited

U.S. PATENT DOCUMENTS 3,580,795 A    5/1971  Eichenlaub
4,288,968 A *  9/1981  Seko ................. B29C 66/91653
                                                          392/394
4,737,231 A *  4/1988  Seko ..................... B29C 66/919
                                                          100/328

FOREIGN PATENT DOCUMENTS

EP    2957507        * 12/2015 ............. B65B 51/10
JP    2011196659     * 10/2011 ............. F28D 15/02
WO    2014/126009 A1   8/2014

OTHER PUBLICATIONS

Extended European Search Report dated Mar. 17, 2022, issued in corresponding European Patent Application No. 21203129.8 (9 pgs.).

* cited by examiner

Primary Examiner — Philip C Tucker
Assistant Examiner — John Blades
(74) Attorney, Agent, or Firm — Pillsbury Winthrop Shaw Pittman, LLP

(57) ABSTRACT

A temperature control apparatus includes: a first pressure bonding unit which includes a first flow passage and a first pressure bonding surface which is to be brought into contact with an object; a temperature control fluid supply device which supplies a temperature control fluid in form of gas to the first flow passage in such a manner that the temperature control fluid is condensed on an inner wall surface of the first pressure bonding unit that partitions the first flow passage to adjust the first pressure bonding surface to a first heating temperature; and a pressure adjustment device which lowers an internal pressure of the first flow passage to promote vaporization of the temperature control fluid in form of liquid in the first flow passage in such a manner that the first pressure bonding surface is adjusted to a temperature lower than the first heating temperature.

9 Claims, 9 Drawing Sheets

TEMPERATURE CONTROL APPARATUS AND TEMPERATURE CONTROL METHOD

CROSS-REFERENCE TO RELATED APPLICATIONS

This application is based upon and claims the benefit of priority from Japanese Patent Application Nos. 2020-180818 and 2021-163034, filed on Oct. 28, 2020 and Oct. 1, 2021 respectively; the entire contents of which are incorporated herein by reference.

TECHNICAL FIELD

The present disclosure relates to a temperature control apparatus and a temperature control method.

BACKGROUND ART

A thermal bonding technology for bonding the mouth part of a bag is widely used.

In the sealing apparatus disclosed in International Publication No. 2014/126009, a heating medium is caused to flow through a flowing part of a sealing unit to perform the heat exchange between the heating medium and a pressure bonding unit of the sealing unit in such a manner that the pressure bonding unit is heated. On the other hand, a cooling medium is caused to flow through the flowing part in such a manner that the pressure bonding unit is cooled.

Summary of Invention Technical Problem

In the sealing apparatus of International Publication No. 2014/126009, a heating medium is caused to flow through the flowing part in order to heat the pressure bonding unit whereas a cooling medium is caused to flow through the flowing part in order to cool the pressure bonding unit.

To that end, it is necessary to install a mechanism for supplying the cooling medium to the flowing part in addition to a mechanism for supplying the heating medium to the flowing part.

Further, in order to cause both the heating medium and the cooling medium to flow through the shared flowing part, it is necessary to install a mechanism for switching the fluid flowing through the flowing part between the heating medium and the cooling medium.

In addition, it takes a corresponding amount of time from a state in which the heating medium is flowing in the flowing part to a state in which the cooling medium is caused to actually flow through the flowing part by switching the fluid flowing through the flowing part from the heating medium to the cooling medium.

The present disclosure has been contrived in view of the above circumstances and provides an advantageous technique for rapidly heating and cooling an object.

Solution to Problem

One aspect of the present disclosure is directed to a temperature control apparatus comprising: a first pressure bonding unit which includes a first flow passage and a first pressure bonding surface which is to be brought into contact with an object; a temperature control fluid supply device which supplies a temperature control fluid in form of gas to the first flow passage in such a manner that the temperature control fluid is condensed on an inner wall surface of the first pressure bonding unit that partitions the first flow passage to adjust the first pressure bonding surface to a first heating temperature; and a pressure adjustment device which lowers an internal pressure of the first flow passage to promote vaporization of the temperature control fluid in form of liquid in the first flow passage in such a manner that the first pressure bonding surface is adjusted to a temperature lower than the first heating temperature.

Another aspect of the present disclosure is directed to a temperature control apparatus comprising: a first pressure bonding unit and a second pressure bonding unit, the first pressure bonding unit including a first flow passage, a first pressure bonding surface of the first pressure bonding unit and a second pressure bonding surface of the second pressure bonding unit nip an object while being in contact with the object; a temperature control fluid supply device which supplies a temperature control fluid in form of gas to the first flow passage in such a manner that the temperature control fluid is condensed on an inner wall surface of the first pressure bonding unit that partitions the first flow passage to adjust the first pressure bonding surface to a first heating temperature; and a pressure adjustment device which lowers an internal pressure of the first flow passage to promote vaporization of the temperature control fluid in form of liquid in the first flow passage in such a manner that the first pressure bonding surface is adjusted to a temperature lower than the first heating temperature.

The temperature control fluid supply device may include: a temperature control fluid supply path which is communicated with the first flow passage; and a supply open-close unit which opens and closes the temperature control fluid supply path, the pressure adjustment device may include: a temperature control fluid discharge path which is communicated with the first flow passage; and a discharge open-close unit which opens and closes the temperature control fluid discharge path, the temperature control fluid supply device may supply the temperature control fluid to the first flow passage via the temperature control fluid supply path, the pressure adjustment device may suck gas in the first flow passage via the temperature control fluid discharge path to lower the internal pressure of the first flow passage, the supply open-close unit may open and close the temperature control fluid supply path in such a manner that an amount of the temperature control fluid supplied to the first flow passage is adjusted, and the discharge open-close unit may open and close the temperature control fluid discharge path in such a manner that the internal pressure of the first flow passage is adjusted.

The second pressure bonding surface may include a second flow passage, the temperature control fluid supply device may supply a temperature control fluid in form of gas to the second flow passage to adjust the second pressure bonding surface to a second heating temperature, the pressure adjustment device may lower an internal pressure of the second flow passage to promote vaporization of a temperature control fluid in form of liquid in the second flow passage in such a manner that the second pressure bonding surface is adjusted to a temperature lower than the second heating temperature.

The temperature control apparatus may further comprise a second pressure bonding unit including a second flow passage and a second pressure bonding surface which is to be brought into contact with the object, wherein: the temperature control fluid supply device may supply a temperature control fluid in form of gas to the second flow passage in such a manner that the second pressure bond surface is adjusted to a second heating temperature, and the pressure adjustment device may lower an internal pressure of the second flow passage to promote vaporization of the temperature control fluid in form of liquid in the second flow passage in such a manner that the second pressure bonding surface is adjusted to a temperature lower than the second heating temperature.

Another aspect of the present disclosure is directed to a temperature control method including the steps of: supplying a temperature control fluid in form of gas to a first flow passage included in a first pressure bonding unit in such a manner that the temperature control fluid is condensed on an inner wall surface of the first pressure bonding unit that partitions the first flow passage to adjust the first pressure bonding surface to a first heating temperature; bringing the first pressure bonding surface of the first pressure bonding unit into contact with an object; and lowering an internal pressure of the first flow passage to promote vaporization of the temperature control fluid in form of liquid in the first flow passage in such a manner that the first pressure bonding surface is adjusted to a temperature lower than the first heating temperature.

Another aspect of the present disclosure is directed to a temperature control method including the steps of: supplying a temperature control fluid in form of gas to a first flow passage included in a first pressure bonding unit in such a manner that the temperature control fluid is condensed on an inner wall surface of the first pressure bonding unit that partitions the first flow passage to adjust the first pressure bonding surface of the first pressure bonding unit to a first heating temperature; bringing the first pressure bonding surface of the first pressure bonding unit and the second pressure bonding surface of the second pressure bonding unit into contact with an object to nip the object; and lowering an internal pressure of the first flow passage to promote vaporization of the temperature control fluid in form of liquid in the first flow passage in such a manner that the first pressure bonding surface is adjusted to a temperature lower than the first heating temperature.

The first flow passage and the second flow passage may be partitioned by a wall surface which promotes a phase change of the temperature control fluid.

According to the present disclosure, it is advantageous to rapidly heat and cool an object.

DESCRIPTION OF EMBODIMENTS

Below, a bonding apparatus and a bonding method which perform bonding of bags are described with reference to the drawings. The following bonding apparatuses and the bonding methods which perform bonding of bags are merely shown as specific examples of a temperature control apparatus and a temperature control method which perform temperature control of an object. The following techniques can be applied to general temperature control apparatuses and temperature control methods which can rapidly raise or lower the temperature of a target area.

Figure 1:
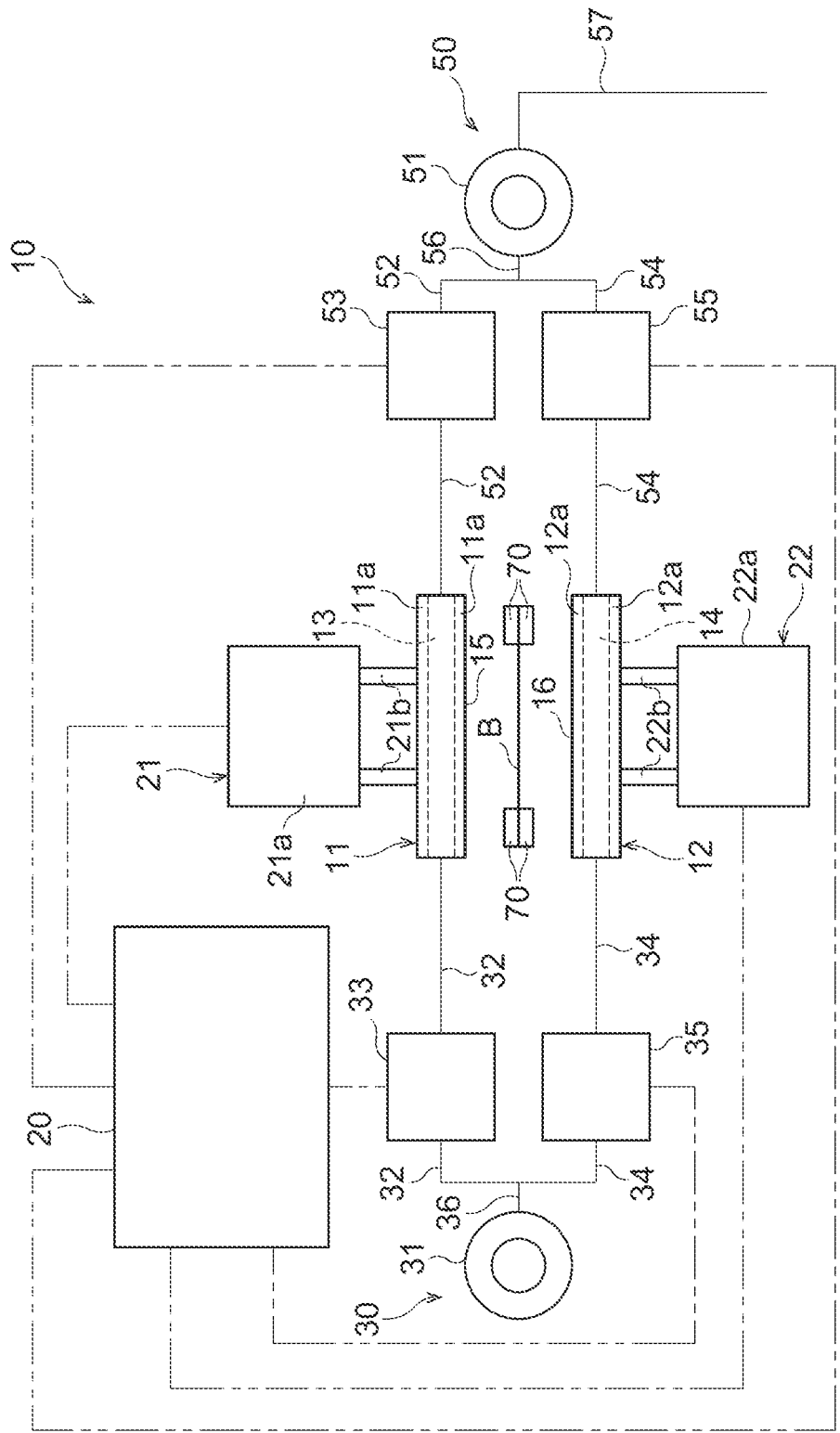
FIG. 1 is a plan view showing a schematic configuration of an example of a bag bonding apparatus which is one of the application examples of a temperature control apparatus.
Figure 2:
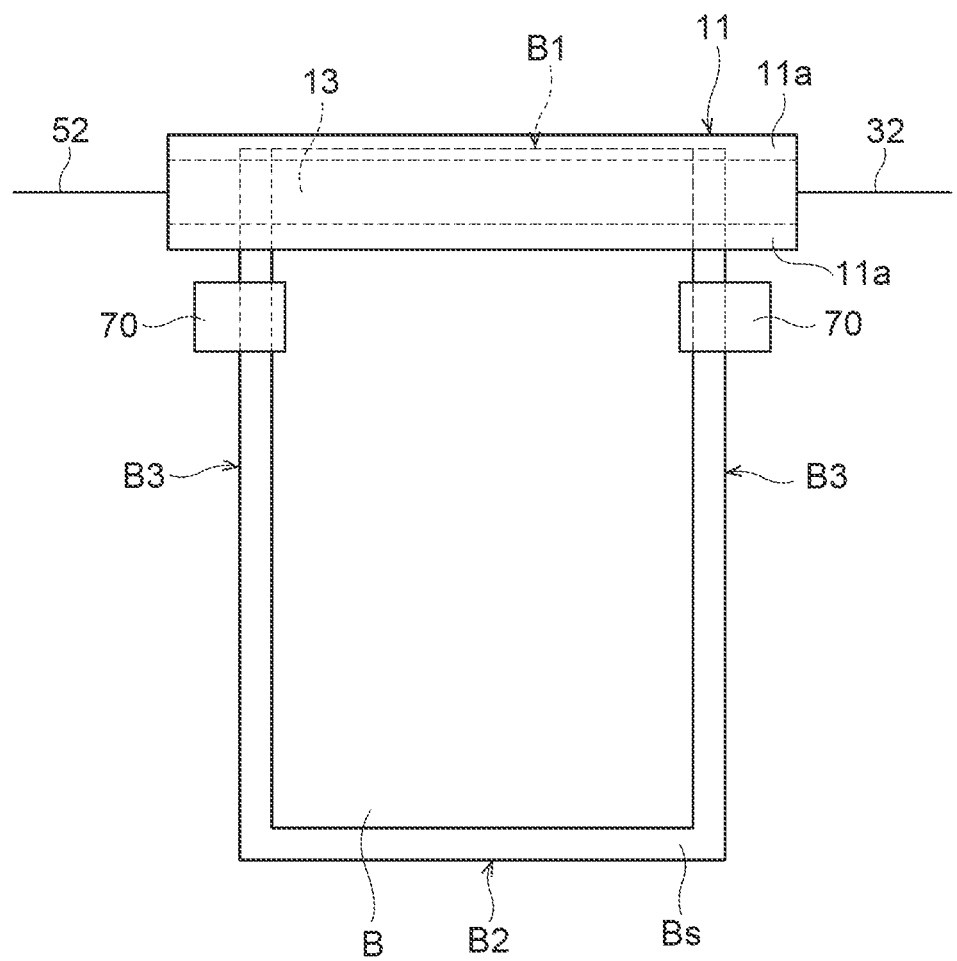
FIG. 2 is a side view showing one example of a bag which is subjected to a bonding process by the bonding apparatus shown in FIG. 1, in an enlarged manner.

FIG. 1 is a plan view showing a schematic configuration of an example of a bonding apparatus 10. FIG. 2 is a side view showing one example of a bag which is subjected to a bonding process by the bonding apparatus shown in FIG. 1, in an enlarged manner.

The bonding apparatus 10 of the present embodiment is an apparatus which performs a thermal boding of a bag B (in particular, a heat sealing of the mouth portion B1) and includes a first pressure bonding unit 11, a second pressure bonding unit 12, a temperature control fluid supply device 30, and a pressure adjustment device 50.

The first pressure bonding unit 11 is provided so as to be able to be moved by a first moving unit 21, and the second pressure bonding unit 12 is provided so as to be able to be moved by a second moving unit 22. The first pressure bonding surface 15 included in the first pressure bonding unit 11 and the second pressure bonding surface 16 included in the second pressure bonding unit 12 face each other and sandwich a bag B (in the present example, the mouth portion B1) positioned between the first pressure bonding surface 15 and the second pressure bonding surface 16 so as to thermally bond the bag B.

The first moving unit 21 and the second moving unit 22 can be configured by any devices and may be configured by, for example, air cylinders. The first moving unit 21 shown in FIG. 1 includes: a first moving main body portion 21a; and first moving protruding portions 21b protruding from the first moving main body portion 21a. Similarly, the second moving unit 22 shown in FIG. 1 includes: a second moving main body portion 22a; and second moving protruding portions 22b protruding from the second moving main body portion 22a. Under the control of a control device 20, the first moving unit 21 changes the amount of protrusion of the first moving protruding portions 21b from the first moving main body portion 21a, and the second moving unit 22 changes the amount of protrusion of the second moving protruding portions 22b from the second moving main body portion 22a. The advancing-retreating direction of the first moving protruding portions 21b and the advancing-retreating direction of the second moving protruding portions 22b coincide with the facing directions of the first pressure bonding surface 15 and the second pressure bonding surface 16 and are horizontal directions in the example shown in FIG. 1 (specifically, the up-down directions in FIG. 1).

The first pressure bonding unit 11 is attached to the tip end portions of the first moving protruding portions 21b and is arranged at a position corresponding to the protruding amount of the first moving protruding portions 21b; for example, the first pressure bonding unit 11 can be arranged at an extended position (i.e., a closed position) where the first pressure bonding unit 11 comes into contact with a bag B and at a retracted position (i.e., an open position) where the first pressure bonding unit 11 is positioned away from a bag B. Similarly, the second pressure bonding unit 12 is attached to the tip end portions of the second moving protruding portions 22b and is arranged at a position corresponding to the protruding amount of the second moving protruding portions 22b; for example, the second pressure bonding unit 12 can be arranged at an extended position (i.e., a closed position) where the second pressure bonding unit 12 comes into contact with a bag B and at a retracted position (i.e., an open position) where the second pressure bonding unit 12 is positioned away from a bag B.

The first pressure bonding unit 11 includes a first flow passage 13 penetrating a main body portion 11a of the first pressure bonding unit 11. The second pressure bonding unit 12 includes a second flow passage 14 penetrating a main body portion 12a of the second pressure bonding unit 12. The first flow passage 13 extends parallel to the first pressure bonding surface 15 along the first pressure bonding surface 15, and the second flow passage 14 extends parallel to the second pressure bonding surface 16 along the second pressure bonding surface 16. However, the first flow passage 13 does not necessarily have to extend along the first pressure bonding surface 15, and the second flow passage 14 does not necessarily have to extend along the second pressure bonding surface 16. The first flow passage 13 and the first pressure bonding surface 15 may extend non-parallel to each other, and the second flow passage 14 and the second pressure bonding surface 16 may extend non-parallel to each other.

The temperature control fluid supply device 30 supplies a gaseous temperature control fluid (i.e., a heat exchange medium) to the first flow passage 13 and the second flow passage 14 so as to adjust the first pressure bonding surface 15 to a first heating temperature and so as to adjust the second pressure bonding surface 16 to the second heating temperature. In particular, the first pressure bonding surface 15 and the second pressure bonding surface 16 can be rapidly heated by utilizing the condensation heat released from the temperature control fluid when the temperature control fluid undergoes a phase change from a gas to a liquid on the inner wall surface of the flow passages. When a gaseous temperature control fluid is supplied to the first flow passage 13 and the second flow passage 14, the gaseous temperature control fluid may be mixed with a liquid temperature control fluid (e.g., liquid droplets of a temperature control fluid), and thus a temperature control fluid in form of wet steam may be supplied to the first flow passage 13 and the second flow passage 14.

The first heating temperature and the second heating temperature are not limited but are temperatures which enables a bag B to be thermally bonded when the bag B are brought into contact with and sandwiched between the first pressure bonding surface 15 and the second pressure bonding surface 16, and preferably, are temperatures which are equal to or higher than the melting point of the bag B (in particular, the bond part). The first heating temperature and the second heating temperature do not have to be the same temperature and may be different temperatures from each other. The first heating temperature and the second heating temperature may be any temperatures as long as the first heating temperature and the second heating temperature enable thermal bonding of the mouth portion B1 of a bag B, do not necessarily have to be specific temperatures, and may vary depending on conditions such as the environmental temperature.

The temperature control fluid can be configured by any fluids. Water can be appropriately used as the temperature control fluid because water is available at a relatively low cost, has a small impact on the environment, and has a large latent heat. For example, when water (in particular, water vapor) is used as the temperature control fluid, the first heating temperature and the second heating temperature may be about 100° C. to about 180° C. (for example, about 120° C. to about 150° C.).

As described above, the temperature of the first pressure bonding surface 15 and the temperature of the second pressure bonding surface 16 can be quickly raised by the heat (including the heat (i.e., condensation heat) emitted when the temperature control fluid condenses) transferred from the temperature control fluid flowing through the first flow passage 13 and the second flow passage 14. Further, as will be described later, the temperature of the first pressure bonding surface 15 and the temperature of the second pressure bonding surface 16 can be quickly lowered by utilizing the heat of vaporization of the liquid temperature control fluid adhering to the inner wall surfaces of the first pressure bonding unit 11 and the second pressure bonding unit 12. Thus, the first pressure bonding unit 11 (in particular, the main body portion 11a located between the first flow passage 13 and the first pressure bonding surface 15) and the second pressure bonding unit 12 (in particular, the main body portion 12a located between the second flow passage 14 and the second pressure bonding surface 16) are preferably configured by materials having excellent thermal conductivity property (heat exchange property) (specifically, materials having high thermal conductivity (for example, copper)).

The temperature control fluid supply device 30 shown in FIG. 1 includes: a temperature control fluid supply source 31; a first temperature control fluid supply path 32 which is communicated with the first flow passage 13; a first supply open-close unit 33 (for example, an on-off valve) which opens and closes the first temperature control fluid supply path 32; a second temperature control fluid supply path 34 which is communicated with the second flow passage 14; and a second supply open-close unit 35 (for example, an on-off valve) which opens and closes the second temperature control fluid supply path 34.

The temperature control fluid supply source 31 is connected to the first temperature control fluid supply path 32 via a confluence supply path 36 and sends a gaseous temperature control fluid to the first temperature control fluid supply path 32 via the confluence supply path 36. Further, the temperature control fluid supply source 31 is connected to the second temperature control fluid supply path 34 via the confluence supply path 36 and sends a gaseous temperature control fluid to the second temperature control fluid supply path 34 via the confluence supply path 36. The temperature of the temperature control fluid sent from the temperature control fluid supply source 31 is not limited, and in the present example, a temperature control fluid having a temperature which is equal to or higher than both the first heating temperature and the second heating temperature is sent form the temperature control fluid supply source 31 to the confluence supply path 36.

The first supply open-close unit 33 opens and closes the first temperature control fluid supply path 32 under the control of the control device 20 in such a manner that the supply amount and pressure of the temperature control fluid supplied to the first flow passage 13 are adjusted. Likewise, the second supply open-close unit 35 opens and closes the second temperature control fluid supply path 34 under the control of the control device 20 in such a manner that the supply amount and pressure of the temperature control fluid supplied to the second flow passage 14 are adjusted.

In this way, the temperature control fluid supply device 30 supplies a temperature control fluid (for example, water vapor) sent from the temperature control fluid supply source 31 to the first flow passage 13 via the confluence supply path 36 and the first temperature control fluid supply path 32 and to the second flow passage 14 via the confluence supply path 36 and the second temperature control fluid supply path 34. In the example shown in FIG. 1, the first temperature control fluid supply path 32 and the second temperature control fluid supply path 34 are connected to a common temperature control fluid supply source 31; however, the first temperature control fluid supply path 32 and the second temperature control fluid supply path 34 may be connected respectively to a plurality of temperature control fluid supply sources 31 (e.g., two temperature control fluid supply sources 31) provided separately. In this case, temperature control fluids sent from different temperature control fluid supply sources 31 are supplied to the first flow passage 13 and the second flow passage 14 via the first temperature control fluid supply path 32 and the second temperature control fluid supply path 34, respectively.

The pressure adjustment device 50 lowers the internal pressure of the first flow passage 13 to promote the vaporization of a liquid temperature control fluid in the first flow passage 13, so that the temperature of the first pressure bonding surface 15 is adjusted to a temperature lower than the first heating temperature. Further, the pressure adjustment device 50 lowers the internal pressure of the second flow passage 14 to promote the vaporization of a liquid temperature control fluid in the second flow passage 14, so that the temperature of the second pressure bonding surface 16 is adjusted to a temperature lower than the second heating temperature. Specifically, the pressure adjustment device 50 reduces the internal pressure of each of the first flow passage 13 and the second flow passage 14 in such a manner that the saturation temperature of the temperature control fluid is lower than the temperature of the first flow passage 13 and the temperature of the second flow passage 14. For example, the pressure adjustment device 50 may reduce the internal pressure of each of the first flow passage 13 and the second flow passage 14 in such a manner that the saturation temperature of the temperature control fluid is lower than the temperature around the bonding apparatus 10 (that is, the ambient temperature; for example, the room temperature (i.e., 5° C. to 35° C.)).

The pressure adjustment device 50 shown in FIG. 1 includes: a pressure adjustment source 51; a first temperature control fluid discharge path 52 which is communicated with the first flow passage 13; a first discharge open-close unit 53 (for example, an on-off valve) which opens and closes the first temperature control fluid discharge path 52; a second temperature control fluid discharge path 54 which is communicated with the second flow passage 14; and a second discharge open-close unit 55 (for example, an on-off valve) which opens and closes the second temperature control fluid discharge path 54.

The pressure adjustment source 51 is connected to each of the first temperature control fluid discharge path 52 via a confluence discharge path 56 and is also connected to a release path 57. The pressure adjustment device 50 (specifically, the pressure adjustment source 51) sucks gas in the first flow passage 13 via the first temperature control fluid discharge path 52 and the confluence discharge path 56 in such a manner that the internal pressure of the first flow passage 13 is reduced. Likewise, the pressure adjustment device 50 (specifically, the pressure adjustment source 51) sucks gas in the second flow passage 14 via the second temperature control fluid discharge path 54 and the confluence discharge path 56 in such a manner that the internal pressure of the second flow passage 14 is reduced. In the example shown in FIG. 1, the first temperature control fluid discharge path 52 and the second temperature control fluid discharge path 54 are connected to a common pressure adjustment source 51; however, the first temperature control fluid discharge path 52 and the second temperature control fluid discharge path 54 may be connected respectively to a plurality of pressure adjustment sources 51 (e.g., two pressure adjustment sources 51) provided separately. In this case, the gas in the first flow passage 13 and the gas in the second flow passage 14 are sucked by different pressure adjustment sources 51 via the first temperature control fluid discharge path 52 and the second temperature control fluid discharge path 54 respectively in such a manner that the internal pressures of the first flow passage 13 and the second flow passage 14 are reduced.

The pressure adjustment source 51 discharges the gas, which has been sucked from the first flow passage 13 and the second flow passage 14, into the release path 57. The release path 57 may guide the gas sent from the pressure adjustment source 51 to lead the gas to a device provided in the subsequent stage or to release the gas into the atmosphere. The pressure adjustment source 51 can be configured by any devices, and for example, a vacuum aspirator or a vacuum pump can be used for the pressure adjustment source 51. A condenser (not shown) may be provided before and/or after the pressure adjustment source 51. Specifically, a condenser which liquefies the temperature control fluid contained in gas may be provided in the first temperature control fluid discharge path 52 positioned between the pressure adjustment source 51 and the first discharge open-close unit 53, in the second temperature control fluid discharge path 54 positioned between the pressure adjustment source 51 and the second discharge open-close unit 55, in the confluence discharge path 56, and/or in the release path 57. By installing a condenser on the upstream side from the pressure adjustment source 51 (specifically, in the first temperature control fluid discharge path 52, the second temperature control fluid discharge path 54 and/or the confluence discharge path 56), the amount of the temperature control fluid flowing into the pressure adjustment source 51 is reduced and the failure of the pressure adjustment source 51 due to the temperature control fluid can be effectively prevented. By installing a condenser on the downstream side from the pressure adjustment source 51 (specifically, in the release path 57), the temperature control fluid sent to the subsequent stage can be reduced.

Under the control of the control device 20, the first supply open-close unit 33 opens and closes the first temperature control fluid supply path 32 and first discharge open-close unit 53 opens and closes the first temperature control fluid discharge path 52 in such a manner that the internal pressure of the first flow passage 13 is adjusted. Likewise, under the control of the control device 20, the second supply open-close unit 35 opens and closes the second temperature control fluid supply path 34 and second discharge open-close unit 55 opens and closes the second temperature control fluid discharge path 54 in such a manner that the internal pressure of the second flow passage 14 is adjusted. In particular, in order to reduce the internal pressures of the first flow passage 13 and the second flow passage 14, the first discharge open-close unit 53 opens the first temperature control fluid discharge path 52 and the second discharge open-close unit 55 opens the second temperature control fluid discharge path 54.

The control device 20 controls the first moving unit 21, the second moving unit 22, the first supply open-close unit 33, the second supply open-close unit 35, the first discharge open-close unit 53, and the second discharge open-close unit 55. Further, the control device 20 may control other devices and, for example, may control the temperature control fluid supply source 31, the pressure adjustment source 51 and a bag support unit 70.

A planned bond part of a bag B (in the present example, the mouth portion B1) is positioned between the first pressure bonding surface 15 and the second pressure bonding surface 16 in a state where the bag B is supported by the bag support unit 70. The bag support unit 70 shown in FIG. 2 nips both side portions B3 of a bag B positioned below the mouth portion B1 (in particular, below the portion which the first pressure bonding unit 11 the second pressure bonding unit 12 comes into contact with and nip) in such a manner that the bag B is held in a suspended state. Thus, in a state where a bag B is supported by the bag support unit 70, the bottom portion B2 of the bag B is located below the mouth portion B1.

The material, shape and size (including thickness) of a bag B are not limited, and a bag B can be configured by, for example, a biomass material or a monomaterial. However, a bag B has properties (for example, melting point, etc.) which enable the bag B to be thermally bonded by causing the bag B to be sandwiched between the first pressure bonding surface 15 heated to the first heating temperature and the second pressure bonding surface 16 heated to the second heating temperature. The contents may or may not be contained inside a bag B. In the bottom portion B2 and each side portion B3 of a bag B shown in FIG. 2, the front side wall surface portion and the back side wall surface portion of the bag B are attached to each other (for example, are heat-welded) to form a seal portion Bs.

Next, an operation example of the bonding apparatus 10 will be described. The bonding method described below is performed by appropriately driving each of the elements of the bonding apparatus 10 under the control of the control device 20.

FIGS. 3 to 8 are plan views showing an operation example of the bonding apparatus 10.

Figure 3:
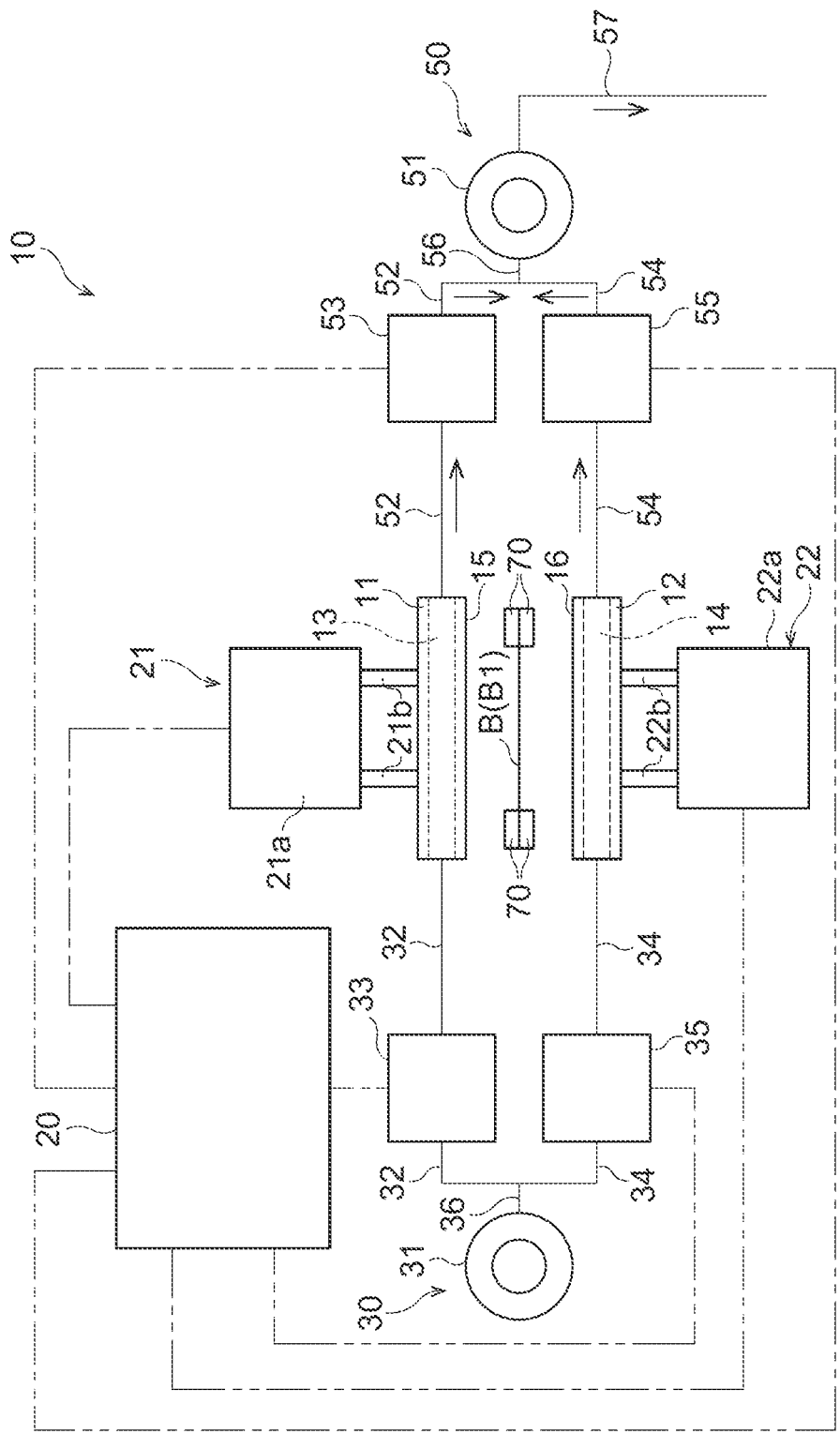
FIG. 3 is a plan view showing an operation example of the bonding apparatus.
Figure 4:
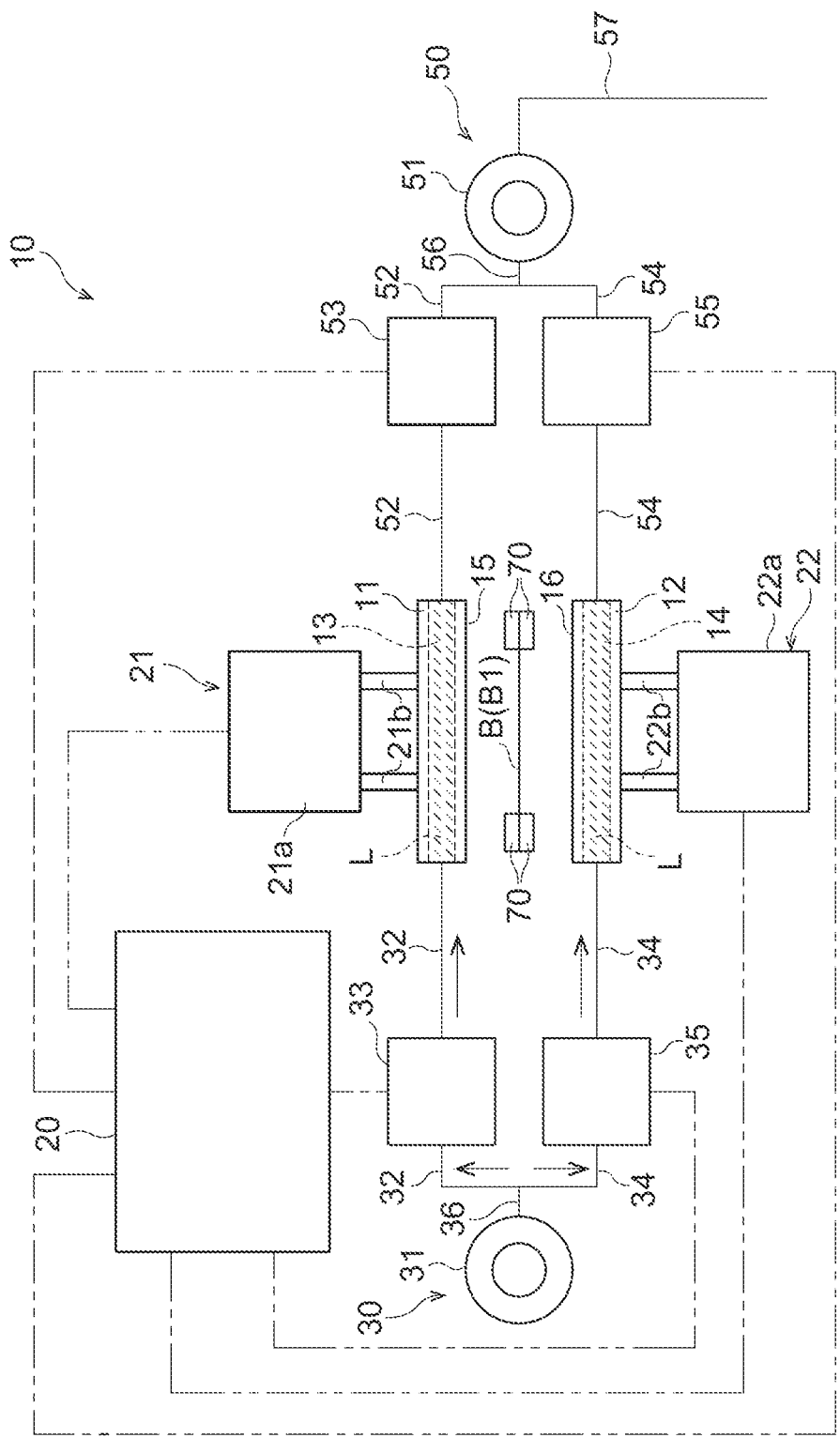
FIG. 4 is a plan view showing an operation example of the bonding apparatus.

In order to bond a bag B (in the present embodiment, the front side wall surface portion and the back side wall surface portion forming the mouth portion B1) by the bonding apparatus 10, the mouth portion B1 of the bag B is positioned between the first pressure bonding surface 15 of the first pressure bonding unit 11 and the second pressure bonding surface 16 of the second pressure bonding unit 12 as shown in FIG. 3 (a preparation step).

Specifically, by reducing the amount of protrusion of each of the first moving protruding portions 21b and the second moving protruding portions 22b, the first pressure bonding unit 11 and the second pressure bonding unit 12 are arranged at open positions where the first pressure bonding unit 11 and the second pressure bonding unit 12 are positioned away from each other, so that a space is created between the first pressure bonding surface 15 and the second pressure bonding surface 16. Then, a bag B supported by the bag support unit 70 moves together with the bag support unit 70 in such a manner that the mouth portion B1 of the bag B is positioned in the space between the first pressure bonding surface 15 and the second pressure bonding surface 16.

On the other hand, the temperature control fluid supply device 30 supplies a gaseous temperature control fluid to the first flow passage 13 to adjust the first pressure bonding surface 15 to the first heating temperature and supplies a gaseous temperature control fluid to the second flow passage 14 to adjust the second pressure bonding surface 16 to the second heating temperature (a temperature rise step).

As an example, in the temperature rise step, first, the first supply open-close unit 33 and the second supply open-close unit 35 are placed in a closed state while the first discharge open-close unit 53 and the second discharge open-close unit 55 are placed in an open state. In other words, the first temperature control fluid supply path 32 is closed by the first supply open-close unit 33, the second temperature control fluid supply path 34 is closed by the second supply open-close unit 35, the first temperature control fluid discharge path 52 is opened by the first discharge open-close unit 53, and the second temperature control fluid discharge path 54 is opened by the second discharge open-close unit 55. Consequently, in a state where no temperature control fluid is newly supplied to the first flow passage 13 and the second flow passage 14, the gas in the first flow passage 13 is sent to the release path 57 via the first temperature control fluid discharge path 52 and the confluence discharge path 56 and the gas in the second flow passage 14 is sent to the release path 57 via the second temperature control fluid discharge path 54 and the confluence discharge path 56. As a result, the first flow passage 13 and the second flow passage 14 are placed in a vacuum state. The arrows shown in FIG. 3 denote the flow of gas.

After that, the first supply open-close unit 33 and the second supply open-close unit 35 are placed in an open state in a state where the first flow passage 13 and the second flow passage 14 are placed in a vacuum state. On the other hand, the first discharge open-close unit 53 and the second discharge open-close unit 55 are placed in a closed state. In doing so, the timing of placing the first supply open-close unit 33 and the second supply open-close unit 35 in an open state and the timing of placing the first discharge open-close unit 53 and the second discharge open-close unit 55 in a closed state may be the same as each other or may be different from each other. For example, the first discharge open-close unit 53 and the second discharge open-close unit 55 may be placed in a closed state after the first supply open-close unit 33 and the second supply open-close unit 35 are placed in an open state. In this case, the first flow passage 13 and the second flow passage 14 are supplied and filled with a gaseous temperature control fluid from the temperature control fluid supply source 31 via the first temperature control fluid supply path 32 and the second temperature control fluid supply path 34, respectively.

In this way, a temperature control fluid of high temperature is supplied to the first flow passage 13 and the second flow passage 14, and the heat of the temperature control fluid is transferred to the first pressure bonding unit 11 and the second pressure bonding unit 12, so that the temperature of the first pressure bonding surface 15 and the temperature of the second pressure bonding surface 16 are increased. In particular, the temperature of the first pressure bonding surface 15 and the temperature of the second pressure bonding surface 16 are increased efficiently and rapidly due to the heat of condensation generated by the phase change of the temperature control fluid from gas to liquid on the partition wall surfaces of the first flow passage 13 and the second flow passage 14. Further, since a temperature control fluid is started to be supplied to the first flow passage 13 and the second flow passage 14 in a state where the first flow passage 13 and the second flow passage 14 are in a vacuum state, the temperature control fluid vigorously flows into the first flow passage 13 and the second flow passage 14 immediately after the first supply open-close unit 33 and the second supply open-close unit 35 are placed in an open state. Further, in a case where the temperature of the first flow passage 13 and the temperature of the second flow passage 14 are low (for example, in a case where those temperatures are an environmental temperature) in a state where the first flow passage 13 and the second flow passage 14 are in a vacuum state, a temperature control fluid is condensed on the partition wall surfaces of the first flow passage 13 and the second flow passage 14 in such a manner that the temperature of the first pressure bonding surface 15 (i.e., the main body portion 11a) and the temperature of the second pressure bonding surface 16 (i.e., the main body portion 12a) can be raised immediately after the temperature control fluid flows into the first flow passage 13 and the second flow passage 14. Therefore, although not shown in FIGS. 4 and 5, in reality, at the stages shown in FIGS. 4 and 5, liquid droplets of a temperature control fluid L (see FIG. 6) may be present on the inner wall surfaces of the first pressure bonding unit 11 and the second pressure bonding unit 12 (that is, the partition wall surfaces defining the first flow passage 13 and the second flow passage 14).

In this way, the first pressure bonding surface 15 and the second pressure bonding surface 16 are adjusted to the first heating temperature and the second heating temperature, respectively. Even after the first pressure bonding surface 15 reaches the first heating temperature, the first supply open-dose unit 33 is kept in an open state and the first discharge open-dose unit 53 is kept in a closed state. Likewise, even after the second pressure bonding surface 16 reaches the second heating temperature, the second supply open-close unit 35 is kept in an open state and the second discharge open-dose unit 55 is kept in a closed state.

The timing of performing the above-mentioned preparation step and temperature rise step is not limited. For example, the temperature rise step may be performed after the preparation step is completed, the preparation step and the temperature rise step may be performed at the same time, or the preparation step may be performed after the temperature rise step is completed.

Figure 5:
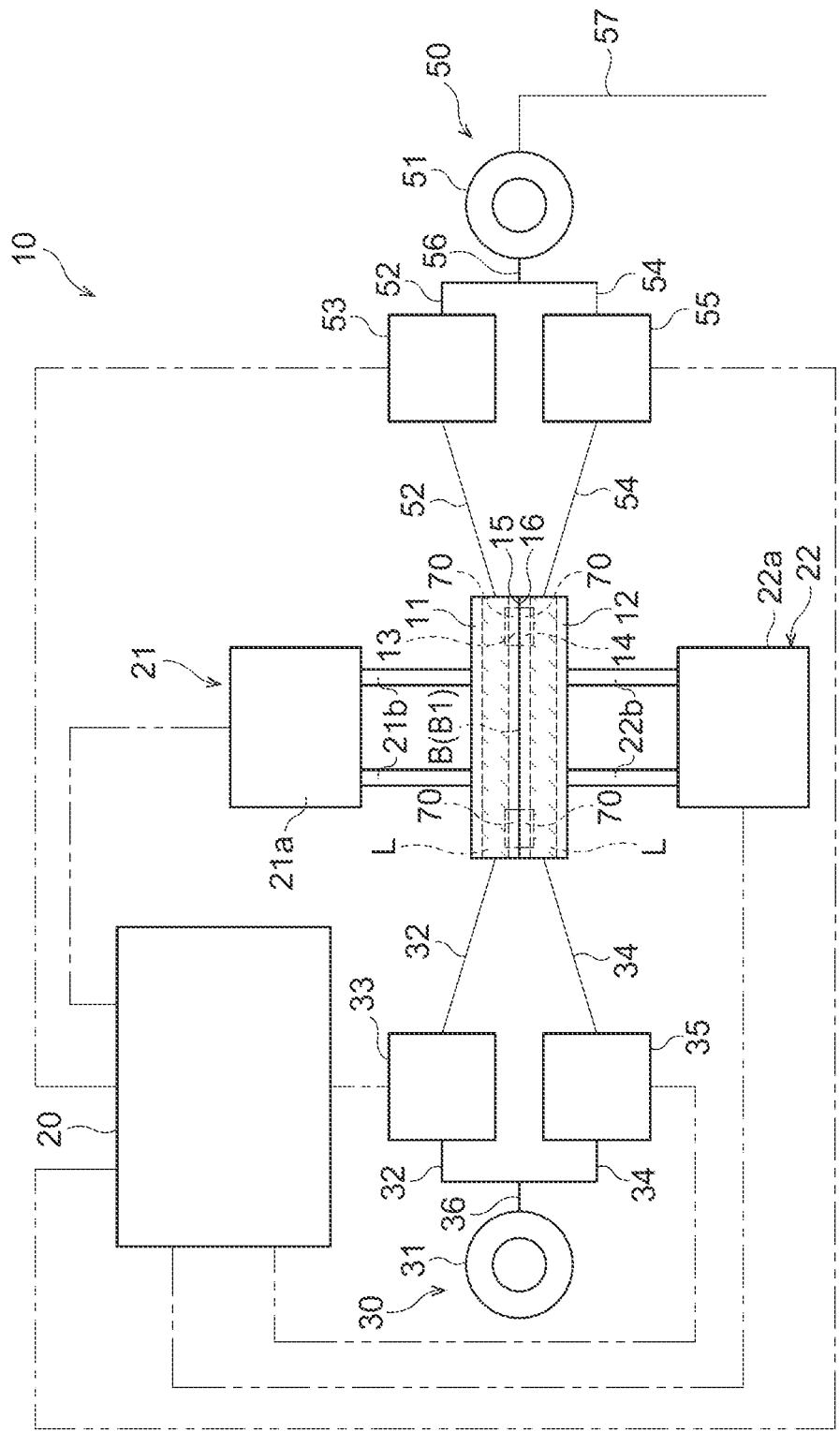
FIG. 5 is a plan view showing an operation example of the bonding apparatus.

Then, as shown in FIG. 5, the first pressure bonding surface 15 of the first pressure bonding unit 11 and the second pressure bonding surface 16 of the second pressure bonding unit 12 nip the mouth portion B1 of the bag B (a bag sandwiching step). Specifically, the amount of protrusion of each of the first moving protruding portions 21b and the second moving protruding portions 22b is increased in such a manner that the first pressure bonding unit 11 and the second pressure bonding unit 12 approach each other and are arranged in a closed position to press the mouth portion B1 of the bag B from both sides.

In the example shown in FIG. 5, the first pressure bonding unit 11 and the second pressure bonding unit 12 move without causing the first supply open-close unit 33, the second supply open-close unit 35, the first discharge open-close unit 53, and the second discharge open-close unit 55 to move. Therefore, the positions (postures) of the parts of the first temperature control fluid supply path 32 connected to the first pressure bonding unit 11 and the first supply open-close unit 33 and the positions (postures) of the parts of the first temperature control fluid discharge path 52 connected to the first pressure bonding unit 11 and the first discharge open-close unit 53 change according to the movement of the first pressure bonding unit 11. Likewise, the positions (postures) of the parts of the second temperature control fluid supply path 34 connected to the second pressure bonding unit 12 and the second supply open-close unit 35 and the positions (postures) of the parts of the second temperature control fluid discharge path 54 connected to the second pressure bonding unit 12 and the second discharge open-close unit 55 change according to the movement of the second pressure bonding unit 12.

Therefore, in the example shown in FIG. 5, the first temperature control fluid supply path 32, the second temperature control fluid supply path 34, the first temperature control fluid discharge path 52 and the second temperature control fluid discharge path 54 expand and contract according to the movement of the first pressure bonding unit 11 and the second pressure bonding unit 12. As a result, even if the distance between the first pressure bonding unit 11 and the first supply open-close unit 33 and the distance between the first pressure bonding unit 11 and the first discharge open-close unit 53 change, a proper flow of a temperature control fluid L is ensured in the first supply open-close unit 33, the first temperature control fluid supply path 32, the first flow passage 13, the first temperature control fluid discharge path 52 and the first discharge open-close unit 53. Likewise, even if the distance between the second pressure bonding unit 12 and the second supply open-close unit 35 and the distance between the second pressure bonding unit 12 and the second discharge open-close unit 55 change, a proper flow of a temperature control fluid L is ensured in the second supply open-close unit 35, the second temperature control fluid supply path 34, the second flow passage 14, the second temperature control fluid discharge path 54 and the second discharge open-close unit 55.

In the present embodiment, when a bag B is nipped by the first pressure bonding surface 15 and the second pressure bonding surface 16 (specifically, when the state of the first pressure bonding surface 15 and the second pressure bonding surface 16 with respect to a bag B is switched from a non-contact state to a contact state), the first pressure bonding surface 15 and the second pressure bonding surface 16 have been adjusted to high temperatures (that is, to the first heating temperature and the second heating temperature). Thus, the first pressure bonding surface 15 and the second pressure bonding surface 16 starts thermal bonding (pressure bonding) of the mouth portion B1 of the bag B at the same time as nipping the mouth portion B1 (specifically, at the same time as contacting the mouth portion B1).

As described above, the bag sandwiching step of the present embodiment is performed in a state where the first pressure bonding surface 15 is adjusted to the first heating temperature and the second pressure bonding surface 16 is adjusted to the second heating temperature in the above-mentioned temperature rise step. However, it is possible to instantaneously adjust the first pressure bonding surface 15 and the second pressure bonding surface 16 to the desired first heating temperature and second heating temperature in the temperature rise step utilizing the heat of condensation of a temperature control fluid; therefore, the bag sandwiching step may be started at the same time as the temperature rise step (in particular, as the timing at which a gaseous temperature control fluid of high temperature is supplied to the first flow passage 13 and the second flow passage 14). Further, the temperature rise step (in particular, the supply of a gaseous temperature control fluid of high temperature to the first flow passage 13 and the second flow passage 14) may be started in a state where the mouth portion B1 of a bag B is sandwiched between the first pressure bonding surface 15 and the second pressure bonding surface 16 in the bag sandwiching step. As described above, the timing at which the first pressure bonding surface 15 and the second pressure bonding surface 16 reach the first heating temperature and the second heating temperature may be either before or after the first pressure bonding surface 15 and the second pressure bonding surface 16 start to perform nipping the mouth portion B1 of the bag B. The first pressure bonding surface 15 and the second pressure bonding surface 16 reach the first heating temperature and the second heating temperature may be either before or after the first pressure bonding surface 15 and the second pressure bonding surface 16 come into contact with the mouth portion B1 of a bag B.

Figure 6:
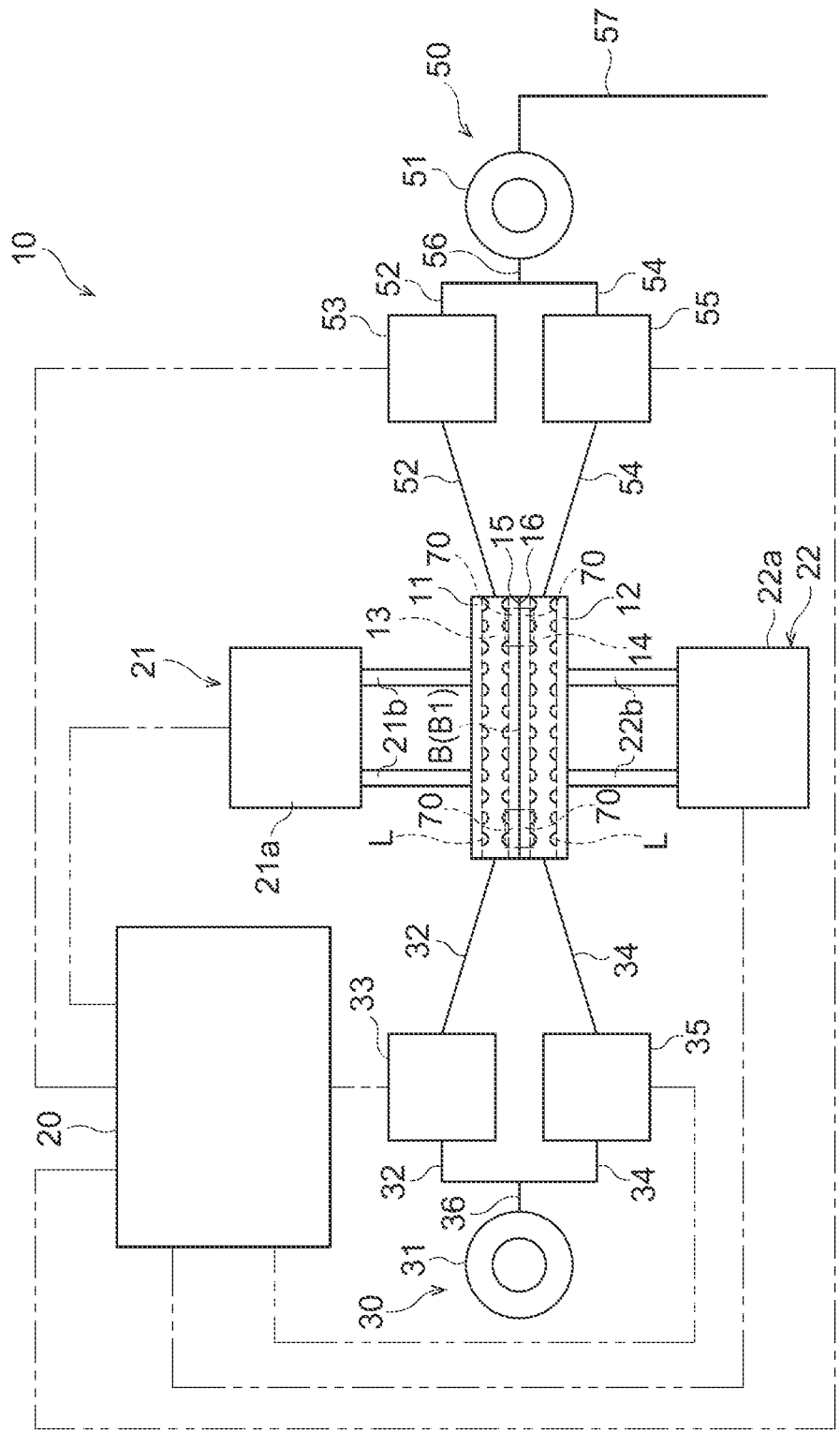
FIG. 6 is a plan view showing an operation example of the bonding apparatus.

As the thermal bonding of the mouth portion B1 of a bag B progresses, the heat of a temperature control fluid in the first flow passage 13 and the second flow passage 14 is gradually taken away in such a manner that the condensation of the temperature control fluid is promoted on the wall surface of the first pressure bonding unit 11 forming the first flow passage 13 and on the wall surface of the second pressure bonding unit 12 forming the second flow passage 14 (see FIG. 6). Typically, the amount of condensation of a temperature control fluid promoted in association with the progress of thermal bonding of the mouth portion B1 of a bag B is smaller than the amount of condensation of a temperature control fluid generated at the same time as when the temperature control fluid flows into the first flow passage 13 and the second flow passage 14.

After the mouth portion B1 is thermally bonded by applying a sufficient amount of heat to a bag B from the first pressure bonding surface 15 and the second pressure bonding surface 16, the pressure adjustment device 50 lowers the internal pressure of the first flow passage 13 to promote the vaporization of the liquid temperature control fluid L in the first flow passage 13 and lowers the internal pressure of the second flow passage 14 to promote the vaporization of the liquid temperature control fluid L in the second flow passage 14 (a cooling step).

Figure 7:
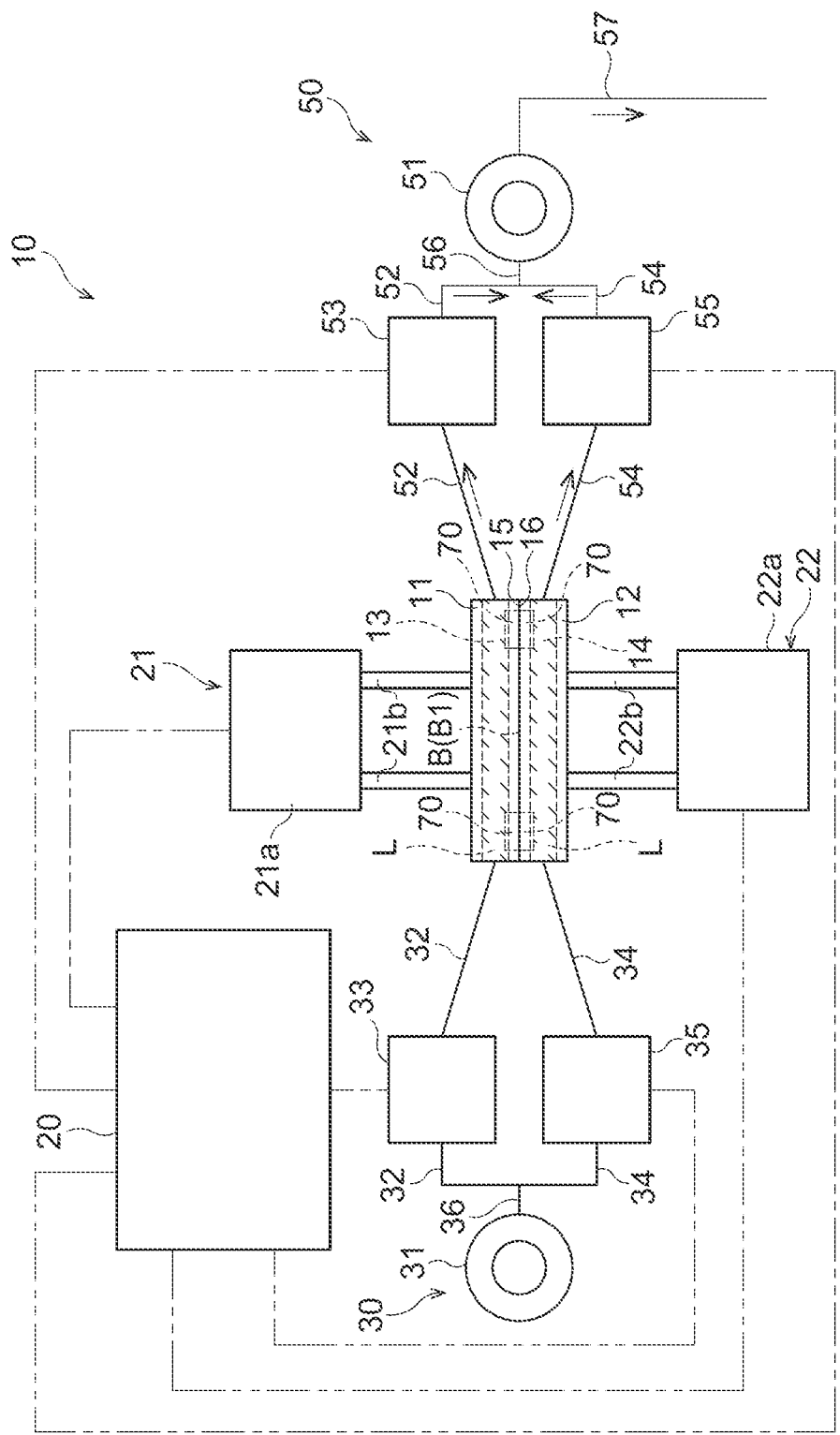
FIG. 7 is a plan view showing an operation example of the bonding apparatus.

Specifically, while the first supply open-close unit 33 and the second supply open-close unit 35 are placed in a closed state, the first discharge open-close unit 53 and the second discharge open-close unit 55 are placed in an open state. As a result, as shown in FIG. 7, the gas in the first flow passage 13 and the second flow passage 14 is sucked out by the pressure adjustment device 50 (in particular, the pressure adjustment source 51) in such a manner that the internal pressure of the first flow passage 13 and the internal pressure of the second flow passage 14 drop. Eventually, the pressures of the first flow passage 13 and the second flow passage 14 are adjusted in such a manner that the saturation temperature of the temperature control fluid L lowers than the temperature of the first flow passage 13 and the temperature of the second flow passage 14.

As a result, the liquid temperature control fluid L adhering to the inner wall surface of the first pressure bonding unit 11 and the inner wall surface of the second pressure bonding unit 12 is vaporized (evaporated) and a large amount of heat is taken from the first pressure bonding unit 11 and the second pressure bonding unit 12 due to the heat of vaporization of the temperature control fluid L, so that the temperatures of the first pressure bonding surface 15 and the second pressure bonding surface 16 are lowered. The first pressure bonding surface 15 is adjusted to a temperature lower than the first heating temperature, the second pressure bonding surface 16 is adjusted to a temperature lower than the second heating temperature, and the mouth portion B1 of the bag B (in particular, the bond part being in contact with and being nipped by the first pressure bonding surface 15 and the second pressure bonding surface 16) is cooled.

By cooling the mouth portion B1 (in particular, the bond part) of the bag B in this way, the joint strength of the mouth portion B1 is increased and the joint state is stabilized.

Figure 8:
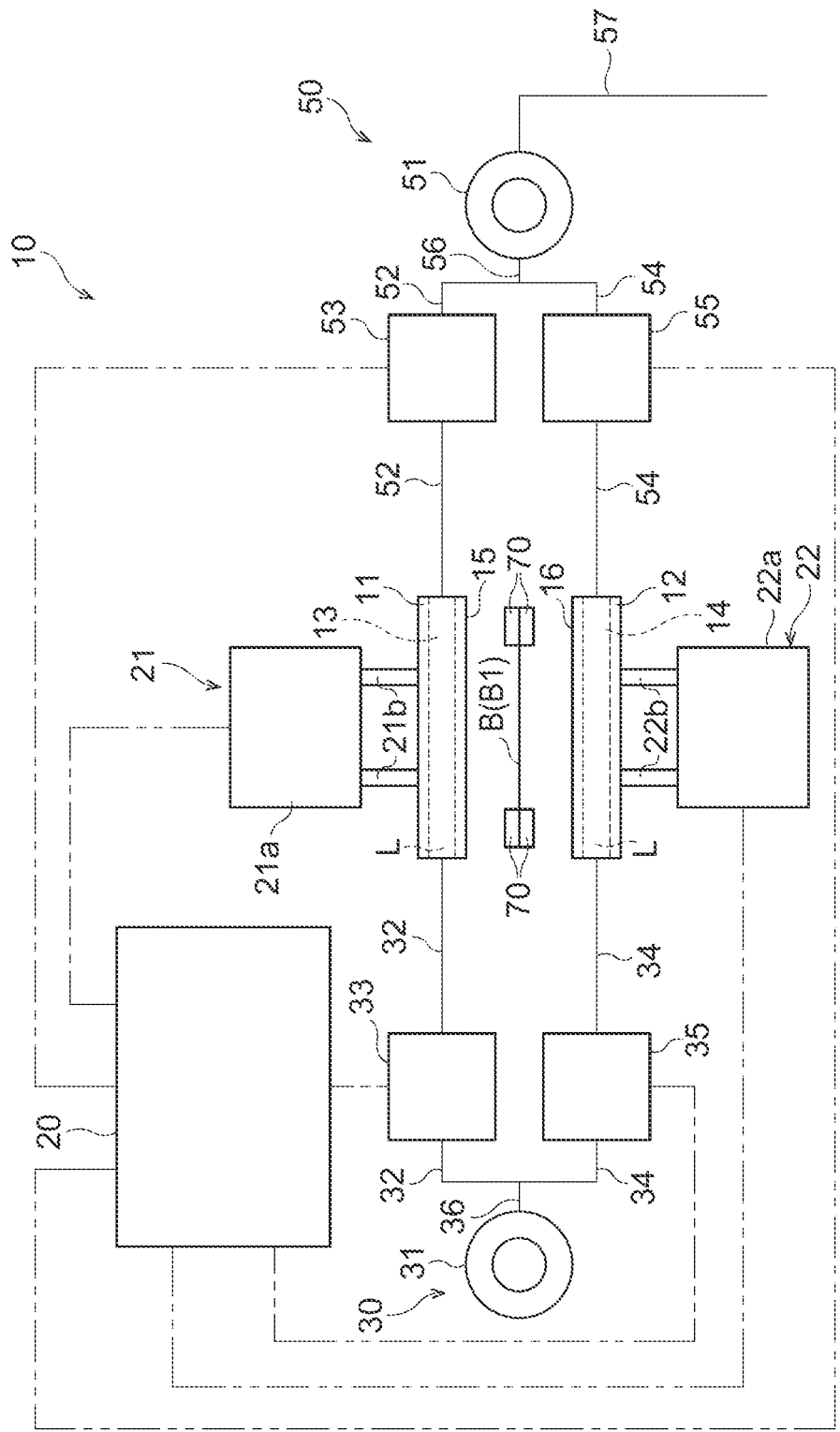
FIG. 8 is a plan view showing an operation example of the bonding apparatus.

After that, the amount of protrusion of each of the first moving protruding portions 21*b* and the second moving protruding portions 22*b* is reduced in such a manner that the first pressure bonding unit 11 and the second pressure bonding unit 12 are arranged at open positions where the first pressure bonding unit 11 and the second pressure bonding unit 12 are separated from each other (see FIG. 8). In doing so, the first supply open-close unit 33, the second supply open-close unit 35, the first discharge open-close unit 53, and the second discharge open-close unit 55 may be placed in a closed state or may be placed in an open state. From a viewpoint of quickly performing the bonding process of a next bag B while saving energy consumption, it is preferable to keep a state where no liquid is adhered to the wall surfaces of the first flow passage 13 and the second flow passage 14 (in other words, a state where the wall surfaces of the first flow passage 13 and the second flow passage 14 are sufficiently dry), after the mouth portion B1 of the bag B is sufficiently cooled. Therefore, while the first pressure bonding unit 11 and the second pressure bonding unit 12 are moved to the open positions and/or are arranged in the open positions, the first flow passage 13 and the second flow passage 14 may be placed in a vacuum state by closing the first supply open-close unit 33 and the second supply open-close unit 35 and opening the first discharge open-close unit 53 and the second discharge open-close unit 55.

Then, a bag B which has undergone the above-mentioned series of bonding processes moves to the subsequent stage together with the bag support unit 70.

Then, a new bag B to be next subjected to the bonding process is moved together with a bag support unit 70 in such a manner that the mouth portion B1 of the new bag B is positioned in the space between the first pressure bonding surface 15 and the second pressure bonding surface 16. Then, the above-mentioned series of bonding processes (see FIGS. 3 to 8) are repeated.

As described above, according to the bonding apparatus 10 and the bonding method of the present embodiment, the vaporization of a liquefied temperature control fluid L having been used for heating a bag B is promoted in such a manner that the temperatures of the first pressure bonding surface 15 and the second pressure bonding surface 16 are lowered to cool the bag B. In this way, the temperature of the first pressure bonding surface 15 and the second pressure bonding surface 16 can be actively and quickly raised or lowered by using a common temperature control fluid. Thus, it is not necessary to separately provide a device for supplying a heating fluid and a device for supplying a cooling fluid, and also it is not necessary to provide a device for switching a fluid to be supplied to each of the first flow passage 13 and the second flow passage 14 between a fluid for heating and a fluid for cooling. Further, by lowering the internal pressures of the first flow passage 13 and the second flow passage 14, the temperatures of the first pressure bonding surface 15 and the second pressure bonding surface 16 can be lowered. As described above, according to the present embodiment, while the structure of the bonding apparatus 10 can be simplified, the first pressure bonding unit 11 (in particular, the first pressure bonding surface 15) and the second pressure bonding unit 12 (in particular, the second pressure bonding surface 16), which conduct thermal bonding of a bag B, can be quickly heated and cooled. Thus, in cases where the heating and cooling of the first pressure bonding unit 11 and the second pressure bonding unit 12 are repeated, the period required for one cycle of the heating and cooling can be remarkably shortened.

Further, before coming into contact with a bag B, the first pressure bonding surface 15 and the second pressure bonding surface 16 are adjusted to the first heating temperature and the second heating temperature by starting the temperature rise of the first pressure bonding surface 15 and the second pressure bonding surface 16 with a temperature control fluid. As a result, the time from when the first pressure bonding surface 15 and the second pressure bonding surface 16 come into contact with a bag B until the thermal bonding of the bag B is completed can be shortened. In particular, because the first pressure bonding surface 15 and the second pressure bonding surface 16 are adjusted to the first heating temperature and the second heating temperature before coming into contact with a bag B, excellent joint strength and excellent joint appearance of the bond part of the bag B (in the present example, the mouth portion B1) can be realized.

[First Variant]

The first flow passage 13 and the second flow passage 14 may be partitioned by wall surfaces which promote a phase change of a temperature control fluid L. Typically, at least a part of each of the first flow passage 13 and the second flow passage 14 may be partitioned by a wall surface having an uneven shape. The inner wall surfaces of the main body portion 11a of the first pressure bonding unit 11 and the main body portion 12a of the second pressure bonding unit 12 (in particular, the parts which partitions the first flow passage 13 and the second flow passage 14) themselves may have an uneven shape. Further, another member installed on each of the inner wall surface of the first pressure bonding unit 11 and the inner wall surface of the second pressure bonding unit 12 may impart an uneven shape to the partition wall surface of each of the first flow passage 13 and the second flow passage 14.

Figure 9:
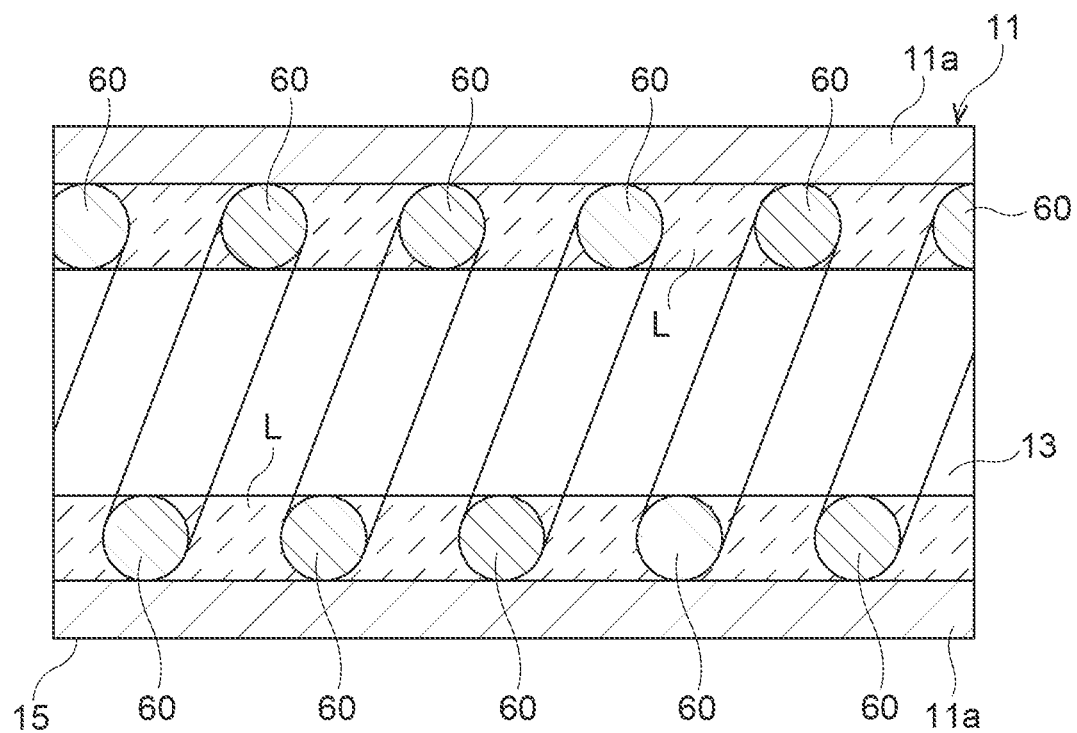
FIG. 9 is a view showing a cross-sectional structure of a first pressure bonding unit according to a first variant, in an enlarged manner, as an example.

FIG. 9 is a view showing a cross-sectional structure of the first pressure bonding unit 11 according to the first variant, in an enlarged manner, as an example.

In each of the first flow passage 13 and the second flow passage 14, a heat transfer enhancement unit for improving the heat transfer coefficient between a gaseous temperature control fluid L and each of the first flow passage 13 and the second flow passage 14 may be provided.

The heat transfer enhancement unit promotes the temperature rise of the first pressure bonding unit 11 (in particular, the first pressure bonding surface 15) and the second pressure bonding unit 12 (in particular, the second pressure bonding surface 16) and promotes the liquefaction of a temperature control fluid L in the first flow passage 13 and the second flow passage 14.

The location, shape, and other characteristics of the heat transfer enhancement unit are not limited. Typically, the heat transfer enhancement unit may be provided to protrude from the inner wall surface of the first pressure bonding unit 11 forming the first flow passage 13 and from the inner wall surface of the second pressure bonding unit 12 forming the second flow passage 14. However, the heat transfer enhancement unit may have a porous body shape and can be formed of, for example, a foamed metal body or particle sintered bodies.

The heat transfer enhancement unit may be fixed to the first pressure bonding unit 11 and the second pressure bonding unit 12 or may be movable with respect to the first pressure bonding unit 11 and the second pressure bonding unit 12. When the heat transfer enhancement unit moves on the inner wall surface each of the first pressure bonding unit 11 and the second pressure bonding unit 12, a temperature control fluid L having been liquefied due to condensation also moves on the inner wall surface of each of the first pressure bonding unit 11 and the second pressure bonding unit 12. Because of the movement of the heat transfer enhancement unit, a liquid temperature control fluid L can be urged to adhere to an area of the inner wall surface of each of the first pressure bonding unit 11 and the second pressure bonding unit 12 in which a liquid temperature control fluid L is less likely to adhere to and which is likely to dry. As a result, a liquid temperature control fluid L can evenly adhere to the inner wall surface of each of the first pressure bonding unit 11 and the second pressure bonding unit 12, and in a later stage, the temperature of each of the first pressure bonding surface 15 and the second pressure bonding surface 16 can be lowered more evenly in whole and thus a bag B can be cooled more uniformly.

Further, the heat transfer enhancement unit may be configured by a structure (including a shape) which is applied directly to each of the inner wall surface of the first pressure bonding unit 11 (i.e., the main body portion 11a) partitioning the first flow passage 13 and the inner wall surface of the second pressure bonding unit 12 (i.e., the main body portion 12a) partitioning the second flow passage 14.

A heat transfer enhancement unit 60 shown in FIG. 9 is arranged in the first flow passage 13 and has a coil shape. The heat transfer enhancement unit 60 can be realized by any material and any form and is typically made by spirally winding a string-like body such as a wire.

The heat transfer enhancement unit 60 is capable of holding a liquid temperature control fluid L. As shown in FIG. 9, a liquid temperature control fluid L tends to stay between coil wires arranged at adjacent positions of the heat transfer enhancement unit 60. Therefore, the heat transfer enhancement unit 60 is capable of effectively retaining a liquid temperature control fluid L on the inner wall surfaces of the first pressure bonding unit 11 and the second pressure bonding unit 12. The state of the temperature control fluid L shown in FIG. 9 is only an example, and for instance, a temperature control fluid L held by the heat transfer enhancement unit 60 may have a meniscus shape.

As described above, a liquid temperature control fluid L tends to stay in sections of the first flow passage 13 and the second flow passage 14 corresponding to the heat transfer enhancement unit 60. Therefore, by providing the heat transfer enhancement unit 60 over the whole of the portion of the first flow passage 13 corresponding to the first pressure bonding surface 15 and over the whole of the portion of the second flow passage 14 corresponding to the second pressure bonding surface 16, the phase change of a temperature control fluid can be promoted in the above-mentioned cooling step (see FIG. 7) to effectively lower the temperatures of the whole of the first pressure bonding surface 15 and the second pressure bonding surface 16.

Further, even when the heat transfer enhancement unit 60 originally has a diameter larger than the cross-sectional diameters of the first flow passage 13 and the second flow passage 14, the heat transfer enhancement unit 60 can be appropriately arranged in the first flow passage 13 and the second flow passage 14 by utilizing the elasticity of the heat transfer enhancement unit 60 to deform and downsize the heat transfer enhancement unit 60. In this case, the heat transfer enhancement unit 60 is in contact with and exerts an elastic force on the inner wall surface of the first pressure bonding unit 11 (specifically, the main body portion 11a) and on the inner wall surface of the second pressure bonding unit 12 (specifically, the main body portion 12a). Therefore, the heat transfer enhancement unit 60 is less likely to be displaced because of the frictional force received from the inner wall surface of the first pressure bonding unit 11 and the inner wall surface of the second pressure bonding unit 12, and is arranged in the first flow passage 13 and the second flow passage 14 in a fixed and stable manner.

[Other Variants]

The present disclosure is not limited to the above-described embodiments and variants.

The temperature control fluid may be supplied to only one of the first pressure bonding unit 11 (in particular, the first flow passage 13) and the second pressure bonding unit 12 (in particular, the second flow passage 14).

When a bag B is nipped by the first pressure bonding surface 15 and the second pressure bonding surface 16 or when a bag B is released from the first pressure bonding surface 15 and the second pressure bonding surface 16, both the first pressure bonding unit 11 and the second pressure bonding unit 12 may be moved or only one of the first pressure bonding unit 11 and the second pressure bonding unit 12 may be moved. When a temperature control fluid is supplied to only one of the first pressure bonding unit 11 (in particular the first flow passage 13) and the second pressure bonding unit 12 (in particular the second flow passage 14) and only one of the first pressure bonding surface 15 and the second pressure bonding surface 16 is moved, only the pressure bonding unit to which the temperature control fluid is supplied may be moved.

In the above-mentioned cooling step (see FIG. 7), cooling of the first pressure bonding surface 15 and the second pressure bonding surface 16 is started in a state where a bag B is nipped by the first pressure bonding surface 15 and the second pressure bonding surface 16. However, before the cooling of the first pressure bonding surface 15 and the second pressure bonding surface 16 is started (specifically, before the internal pressures of the first flow passage 13 and the second flow passage 14 are reduced), the first pressure bonding unit 11 and the second pressure bonding unit 12 may be arranged in an open position in such a manner that the first pressure bonding surface 15 and the second pressure bonding surface 16 are separated from the bag B. In this case, in a state where the first pressure bonding surface 15 and the second pressure bonding surface 16 are separated from the bag B, the internal pressures of the first flow passage 13 and the second flow passage 14 may be reduced to lower the temperatures of the first pressure bonding surface 15 and the second pressure bonding surface 16. Further, while the temperatures of the first pressure bonding surface 15 and the second pressure bonding surface 16 are being lowered or after the temperatures of the first pressure bonding surface 15 and the second pressure bonding surface 16 are sufficiently lowered, the first pressure bonding unit 11 and the second pressure bonding unit 12 may be placed in a closed positions in such a manner that the bond part of the bag B (in the present example, the mouth portion B1) is cooled by the first pressure bonding surface 15 and the second pressure bonding surface 16.

The above-mentioned bonding apparatus 10 bonds the mouth portion B1 of a bag B, but may bond another part of a bag B.

In the above-described bonding process by the bonding apparatus 10, a bag B itself is joined (specifically, the front side wall surface portion and the back side wall surface portion of the bag B), but the bonding apparatus 10 may join a bag B to another member (for example, a spout). For example, the above-mentioned bonding apparatus 10 can be applied to a device which thermally bonds a spout (not shown) to the mouth portion B1 of a bag B. In this case, for example, while a spout is positioned between the front side wall surface portion and the back side wall surface portion of a bag B, the front side wall surface, the spout and the back side wall surface are bonded to each other by the first pressure bonding surface 15 of the first pressure bonding unit 11 and the second pressure bonding surface 16 of the second pressure bonding unit 12. In a case where the first pressure bonding unit 11 and the second pressure bonding unit 12 press a bag B against the bond surfaces of another member (e.g., a spout or the like), it is preferable that the first pressure bonding surface 15 and the second pressure bonding surface 16 have shapes corresponding to the bond surfaces of said member.

Heaters (not shown) may be installed in the first temperature control fluid supply path 32 and the second temperature control fluid supply path 34 in such a manner that the heaters heat a temperature control fluid flowing through the first temperature control fluid supply path 32 and the second temperature control fluid supply path 34. In this case, it is preferable that the on-off control of the heaters be performed under the control of the control device 20. For example, the heaters may be placed in a turn-on state "before starting the supply of the temperature controlling fluid from the temperature control fluid supply source 31 to the first flow passage 13 and the second flow passage 14". In this case, the temperatures of the first temperature control fluid supply path 32 and the second temperature control fluid supply path 34 can be adjusted to a temperature effective for suppressing the temperature drop of a temperature control fluid in the first temperature control fluid supply path 32 and the second temperature control fluid supply path 34. Further, the heaters may be placed in an on-state to heat a temperature control fluid flowing in the first temperature control fluid supply path 32 and the second temperature control fluid supply path 34 during at least a part of the time period from "the start of supply of the temperature control fluid from the temperature control fluid supply source 31 to the first flow passage 13 and the second flow passage 14" until "the start of the process of lowering the temperatures of the first pressure bonding surface 15 and the second pressure bonding surface 16", On the other hand, the heaters may be placed in an off-state not to heat a temperature control fluid flowing in the first temperature control fluid supply path 32 and the second temperature control fluid supply path 34 after "the start of the process of lowering the temperatures of the first pressure bonding surface 15 and the second pressure bonding surface 16".

A heating device and/or a cooling device (not shown) which adjust the temperatures of the first pressure bonding unit 11 and the second pressure bonding unit 12 may be installed. It is preferable that the on-off control of these heating device and cooling device be performed under the control of the control device 20. The control device 20 may perform the on-off control of the heating device and the cooling device, for example, based on the measurement results of a temperature sensor which directly or indirectly measures the temperatures of the first pressure bonding unit 11 (for example, the first pressure bonding surface 15) and the second pressure bonding unit 12 (for example, the second pressure bonding surface 16).

For example, in a case where a temperature control fluid of high temperature is made to flow in the first flow passage 13 and the second flow passage 14 in a state where the temperatures of the first pressure bonding unit 11 and the second pressure bonding unit 12 are low, there is a concern that the first pressure bonding surface 15 and the second pressure bonding surface 16 are not heated to desired heating temperatures (i.e., the first heating temperature and the second heating temperature). Therefore, prior to supplying a temperature control fluid of high temperature to the first flow passage 13 and the second flow passage 14, the first pressure bonding unit 11 and the second pressure bonding unit 12 may be heated by the heating device in such a manner that the first pressure bonding unit 11 and the second pressure bonding unit 12 are adjusted to desired preparation temperatures. The "desired preparation temperatures" referred to here are temperatures enough to raise the temperatures of the first pressure bonding surface 15 and the second pressure bonding surface 16 to desired heating temperatures when the temperature control fluid of high temperature is made to flow in the first flow passage 13 and the second flow passage 14.

Likewise, prior to cooling the first pressure bonding unit 11 and the second pressure bonding unit 12 in order to lower the temperatures of the first pressure bonding surface 15 and the second pressure bonding surface 16 (specifically, in the above-described embodiment, prior to reducing the internal pressures of the first flow passage 13 and the second flow passage 14), the first pressure bonding unit 11 and the second pressure bonding unit 12 may be cooled by the cooling device in such a manner that the first pressure bonding unit 11 and the second pressure bonding unit 12 are adjusted to desired preparation temperatures. The "desired preparation temperatures" referred to here are temperatures enough to lower the temperatures of the first pressure bonding surface 15 and the second pressure bonding surface 16 to desired cooling temperatures when the first pressure bonding unit 11 and the second pressure bonding unit 12 are cooled.

The installation mode of the heating device and the cooling device described above is not limited. For example, the heating device and the cooling device may be installed in the first pressure bonding unit 11 and the second pressure bonding unit 12. Further, the heating device and the cooling device may be installed on other members attached to the first pressure bonding unit 11 and the second pressure bonding unit 12. In a case where the first pressure bonding unit 11 and the second pressure bonding unit 12 are configured by long tubular bodies, there is a concern that the first pressure bonding unit 11 and the second pressure bonding unit 12 may be bent relatively significantly. Therefore, the first pressure bonding unit 11 and the second pressure bonding unit 12 may be supported by bases (not shown), and the heating device and the cooling device may be installed on each of the bases. In this case, the heating device and the cooling device directly control the temperature of each of the bases to indirectly control the temperatures of the first pressure bonding unit 11 and the second pressure bonding unit 12.

In the above-described embodiment, regardless of the movement of the first pressure bonding unit 11 and the second pressure bonding unit 12, the positions of the first supply open-close unit 33, the second supply open-close unit 35, the first discharge open-close unit 53, and the second discharge open-close unit 55 are unchanged. However, the first supply open-close unit 33 and the first discharge open-close unit 53 may move according to the movement of the first pressure bonding unit 11, and the second supply open-close unit 35 and the second discharge open-close unit 55 may move according to the movement of the second pressure bonding unit 12.

The movement directions of the first pressure bonding unit 11 and the second pressure bonding unit 12 are not limited. The first moving unit 21 may move the first pressure bonding unit 11 in a linear manner as described above, may move the first pressure bonding unit 11 along a curve (for example, an arc), or may move the first pressure bonding unit 11 along a trajectory made from a combination of two or more types of lines and/or curves. Likewise, the second moving unit 22 may move the second pressure bonding unit 12 in a linear manner as described above, may move the second pressure bonding unit 12 along a curve (for example, an arc), or may move the second pressure bonding unit 12 along a trajectory made from a combination of two or more types of lines and/or curves. Therefore, the advancing-retreating direction of the first moving protruding portions 21b and the advancing-retreating direction of the second moving protruding portions 22b do not have to coincide with the facing directions of the first pressure bonding surface 15 and the second pressure bonding surface 16.

In the above-described embodiment, a bag B is nipped by the first pressure bonding surface 15 of the first pressure bonding unit 11 and the second pressure bonding surface 16 of the second pressure bonding unit 12 to seal the mouth portion B1, but the second pressure bonding unit 12 does not necessarily have to be provided. For example, a gas may be blown from a blower (not shown) to a bag B to press the bag B (for example, the mouth portion B1) against the first pressure bonding surface 15 in such a manner that the sealing process is applied to the bag B. Further, the sealing process may be applied to a bag B by adjusting the space between the bag B and the first pressure bonding surface 15 to a vacuum with a vacuum device (not shown) to bring the bag B (for example, the mouth portion B1) into closely contact with the first pressure bonding surface 15.

While the above-mentioned bonding apparatus 10 is an apparatus which performs the temperature control of a bag B, the above-mentioned techniques can be applied to apparatuses and methods which perform the temperature control of objects other than a bag B.

Various modifications may be added to each element of the above-described embodiments and variants. Further, the configurations of the above-described embodiments and variants may be combined in whole or in part.

The invention claimed is:

1. A temperature control apparatus comprising:
   a first pressure bonding unit including a first flow passage and a first pressure bonding surface that is configured to be brought into contact with an object;
   a temperature control fluid supply device configured to supply a temperature control fluid in form of a gas to the first flow passage in such a manner that the temperature control fluid is condensed on an inner wall surface of the first pressure bonding unit that partitions the first flow passage to adjust the first pressure bonding surface to a first heating temperature; and
   a controller configured to operate a pressure adjustment device to lower an internal pressure of the first flow passage to place the first flow passage in a vacuum state so as to promote vaporization of the temperature control fluid in form of liquid in the first flow passage in such a manner that the first pressure bonding surface is adjusted to a temperature lower than the first heating temperature.

2. The temperature control apparatus as defined in claim 1, wherein the temperature control fluid supply device includes: a temperature control fluid supply path that is communicated with the first flow passage; and a supply open-close unit that is configured to open and close the temperature control fluid supply path,
   wherein the pressure adjustment device includes: a temperature control fluid discharge path that is communicated with the first flow passage; and a discharge open-close unit that is configured to open and close the temperature control fluid discharge path, wherein the temperature control fluid supply device is configured to supply the temperature control fluid to the first flow passage via the temperature control fluid supply path, wherein the pressure adjustment device is configured to suck gas in the first flow passage via the temperature control fluid discharge path to lower the internal pressure of the first flow passage, wherein the supply open-close unit is configured to open and close the temperature control fluid supply path in such a manner that an amount of the temperature control fluid supplied to the first flow passage is adjusted, and wherein the discharge open-close unit is configured to open and close the temperature control fluid discharge path in such a manner that the internal pressure of the first flow passage is adjusted.

3. The temperature control apparatus as defined in claim 2, wherein the first flow passage is partitioned by a wall surface that promote a phase change of the temperature control fluid.

4. The temperature control apparatus as defined in claim 3, further comprising a second pressure bonding unit including a second flow passage and a second pressure bonding surface that is configured to be brought into contact with the object, wherein the temperature control fluid that is supplied to the first flow passage is a first temperature control fluid, wherein the temperature control fluid supply device is configured to supply a second temperature control fluid in form of a gas to the second flow passage in such a manner that the second pressure bonding surface is adjusted to a second heating temperature, and wherein the pressure adjustment device is configured to lower an internal pressure of the second flow passage to promote vaporization of the temperature control fluid in form of liquid in the second flow passage in such a manner that the second pressure bonding surface is adjusted to a temperature lower than the second heating temperature.

5. The temperature control apparatus as defined in claim 2, further comprising a second pressure bonding unit including a second flow passage and a second pressure bonding surface which is to be brought into contact with the object, wherein the temperature control fluid that is supplied to the first flow passage is a first temperature control fluid, wherein the temperature control fluid supply device supplies a second temperature control fluid in form of a gas to the second flow passage in such a manner that the second pressure bonding surface is adjusted to a second heating temperature, and wherein the pressure adjustment device lowers an internal pressure of the second flow passage to promote vaporization of the temperature control fluid in form of liquid in the second flow passage in such a manner that the second pressure bonding surface is adjusted to a temperature lower than the second heating temperature.

6. The temperature control apparatus as defined in claim 1, wherein the first flow passage is partitioned by a wall surface that promote a phase change of the temperature control fluid.

7. The temperature control apparatus as defined in claim 6, further comprising a second pressure bonding unit including a second flow passage and a second pressure bonding surface which is to be brought into contact with the object, wherein the temperature control fluid that is supplied to the first flow passage is a first temperature control fluid, wherein the temperature control fluid supply device is configured to supply a second temperature control fluid in form of a gas to the second flow passage in such a manner that the second pressure bonding surface is adjusted to a second heating temperature, and wherein the pressure adjustment device is configured to lower an internal pressure of the second flow passage to promote vaporization of the temperature control fluid in form of liquid in the second flow passage in such a manner that the second pressure bonding surface is adjusted to a temperature lower than the second heating temperature.

8. The temperature control apparatus as defined in claim 1, further comprising a second pressure bonding unit including a second flow passage and a second pressure bonding surface that is configured to be brought into contact with the object, wherein the temperature control fluid that is supplied to the first flow passage is a first temperature control fluid, wherein the temperature control fluid supply device is configured to supply a second temperature control fluid in form of a gas to the second flow passage in such a manner that the second pressure bonding surface is adjusted to a second heating temperature, and wherein the pressure adjustment device is configured to lower an internal pressure of the second flow passage to promote vaporization of the temperature control fluid in form of liquid in the second flow passage in such a manner that the second pressure bonding surface is adjusted to a temperature lower than the second heating temperature.

9. The temperature control apparatus as defined in claim 8, wherein the first temperature control fluid and the second temperature control fluid comprise a same material.

* * * * *